US006361175B1

(12) United States Patent
Kittelmann et al.

(10) Patent No.: US 6,361,175 B1
(45) Date of Patent: Mar. 26, 2002

(54) OPTICAL DESIGN FOR A REFLECTOR FOR REFLECTING LIGHT BEAMS

(75) Inventors: Rüdiger Kittelmann, Einbeck; Harry Wagener, Alfeld, both of (DE)

(73) Assignee: Schott Auer GmbH, Bad Gandersgeim (DE)

( * ) Notice: Subject to any disclaimer, the term of this patent is extended or adjusted under 35 U.S.C. 154(b) by 0 days.

(21) Appl. No.: 09/521,290

(22) Filed: Mar. 8, 2000

(30) Foreign Application Priority Data

Mar. 9, 1999 (DE) ........................................ 199 10 192

(51) Int. Cl.[7] ................................................ G02B 5/081

(52) U.S. Cl. ........................ 359/851; 359/850; 359/852; 359/853

(58) Field of Search ................................ 359/851, 850, 359/852, 853, 854; 362/341, 347, 348, 350, 360, 361

(56) References Cited

U.S. PATENT DOCUMENTS 4,153,929 A * 5/1979 Laudenschlarger et al. . 362/348

FOREIGN PATENT DOCUMENTS

| | | |
|---|---|---|
| DE | 195 43 005 | 5/1997 |
| DE | 196 27 940 | 10/1997 |
| EP | 0 005 080 | 10/1979 |
| EP | 0 250 191 | 12/1987 |

* cited by examiner

*Primary Examiner*—Mohammad Sikder

(74) *Attorney, Agent, or Firm*—Ohlandt, Greeley, Ruggiero & Perle, LLP

(57) ABSTRACT

The invention relates to a reflector having reflection surface with facets for reflecting light beams and for generating a light field with a hollow basic element which presents a first end for accommodating an illuminant (mounting end), as well as a second end which represents a light outlet aperture, whereby for generating a specific light field contour with a given form of illuminant the forms of individual facets and their position relative to the optical axis of the reflector are selected specifically.

11 Claims, 3 Drawing Sheets

OPTICAL DESIGN FOR A REFLECTOR FOR REFLECTING LIGHT BEAMS

BACKGROUND OF THE INVENTION (1) Field of the Invention

The present invention relates to the optical design of a reflector in the form of facets for reflecting light beams. Such reflectors are utilised, for example, for lighting for general illumination purposes. They have found wide application in fibre optics, for example. They are also utilised for light supply in video projectors or in spotlights which generate a sharply defined light field (so-called tracking spotlights).

(2) Description of Related Art

Such reflectors generally have an elliptical, parabolic or conical basic contour. In many cases an optical design in the form of facets is overlaid on this basic contour, in order to improve the uniformity of the light field and/or to increase the size of the light field.

In general, the aim is to have reflectors of this kind produce a circular light field. This is not always accomplished, however. The reason for this is that the illuminants being utilised are not rotationally symmetrical. The outcome of this is a light field which deviates from the circular form. It may be oval or similar to the shape of a right angle, which is undesired.

On the contrary, the case may arise where there was a light field deviating from the circular form, and where only rotationally symmetrical illuminants can be used only for manufacturing or installation reasons. With use of such a rotationally symmetrical illuminant a light field deviating from the circular form is therefore not possible with many means.

SUMMARY OF THE INVENTION

The object of the present invention is to develop an optical design for a reflector for reflecting light beams in such a way that light fields are created arbitrarily which are at least approximately circular or approximately rectangular, and this irrespective of the shape of the illuminant being used.

The inventors have acknowledged that a specific light field contour with a given form of the illuminant can be generated alone by choice of the forms of individual or all facets, as well as by arrangement or positioning of such facets relative to the optical axis of the reflector basic element.

The following problems are resolved by the present invention.

Either a non-rotationally symmetrical illuminant is presented the aim of which is to generate a round light field, or a rotationally symmetrical illuminant is presented the aim of which is to generate a non-circular light field. In both cases, the facets are formed and arranged such that rotational symmetry of the facets is substantially avoided, with respect to the optical axis of the basic reflector element.

The invention can be carried out in practice in a variety of ways.

With respect to the forms of the facets there are numerous possibilities. The facets can be flat, spherical or cylindrical. In the latter two cases they can also be concave or convex.

Deviation from the rotational symmetry may also be due to the fact that some groups of facets are larger and other groups are smaller. It is decisive that certain facets or groups of facets extending over a certain peripheral range of the basic reflector element differ from certain other facets or groups of facets with respect to their form and position, which extend over another peripheral range.

Known reflectors present facets which run in rows which in turn are arranged in planes vertical to the axis. In the plan view of the hollow basic reflector element, and therefore into this, the entire reflection surface can be divided into columns extending from the light outlet aperture of the reflector to mounting the illuminant. The dividing lines between adjacent columns can be coincident with meridian lines, but must not do so.

Likewise, the abovementioned rows must not run in planes vertical to the axis. They could also wind around the optical axis of the reflector in a spiral.

Of the countless ways of providing rotational asymmetry, the following possibility deserves mention: if the facets are of a cylindrical shape, the axes of the cylinders can run parallel to the optical axis of the reflector, though in a peripheral direction.

Another possibility consists of pairing uneven shapes with one another. An area of reflector inner surface can be formed from spherical facets, for example, while another area can be formed from flat facets. Another pairing between different columns can consist of concave and convex cylinders, or in large and small cylinders.

BRIEF DESCRIPTION OF THE DRAWING

The invention is explained in greater detail with respect to the diagrams, in which.

DESCRIPTION OF THE INVENTION

Figure 1:
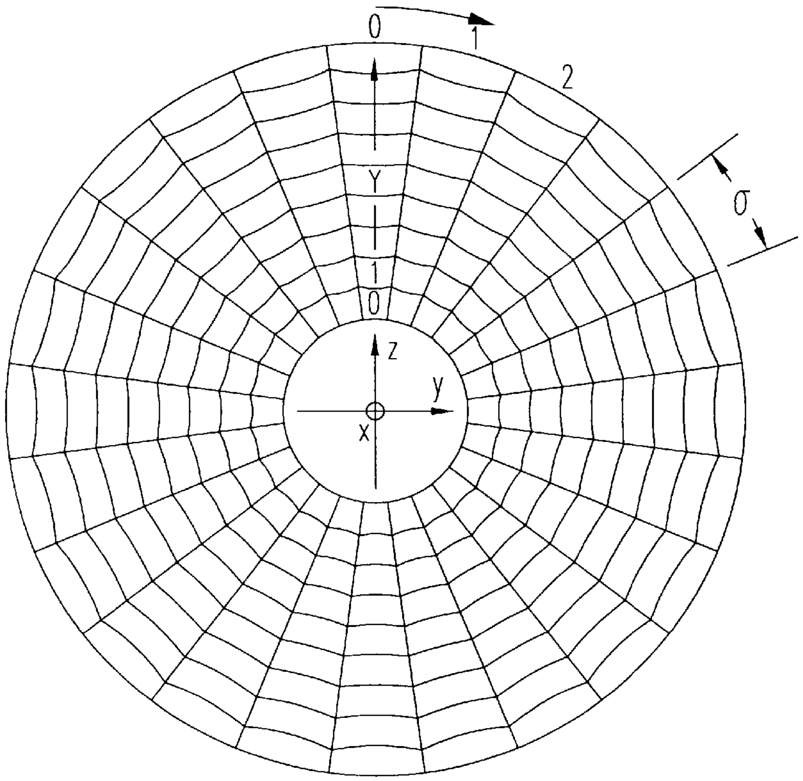
FIG. 1 shows a plan view of a faceted reflector having 24 columns and 9 rows.

In the reflector illustrated in FIG. 1 the facets are arranged in rows which run concentrically to the x axis. At the same time the facets are arranged in columns and may be spherical or cylindrical in shape.

The radii of the facets, that is, the radii of the spheres or the cylinders, vary within a row of facets corresponding to the size of the dihedral angle at which the facet 'sees' the illuminant. In the case of a large dihedral angle and associated greater light scatter a lesser curvature of the facet surface is accordingly selected, thus a greater facet radius, and vice versa. If the dimensions of the illuminant are greater in the direction of the y axis than in the direction of the z axis, the radii of the facets must be greater in two columns, which lie on the z axis, than the radii of the facets in both columns which lie on the y axis. The radii of the facets in the in-between columns are to be selected appropriately between both these extreme values.

In practice the following cosine-related equation has proven highly appropriate:

$$R_{r,s} = \frac{R_z - R_y}{2} \cdot \cos\left(4\pi \frac{s}{C_r}\right) + \frac{R_z + R_y}{2}$$

Other periodic equations can be selected with the same period, such as:

$$R_{r,s}=(R_z-R_y)\cdot\left(\cos^2\left(2\pi\frac{s}{C_r}\right)-\frac{1}{2}\right)+\frac{R_z+R_y}{2}$$

A similar effect is achieved when not the radius of the facet within a row is varied, rather the angle over which a column of facets extends is varied. This principle can be applied to not only spherical or cylindrical facets, but also flat facets. The sector angles of spherical or cylindrical or flat facets within a row of facets can be varied according to the size of the dihedral angle, at which the facet 'sees' the illuminant. In the case of a large dihedral angle and associated greater light scatter a lesser sector angle is accordingly selected, and vice versa. If the dimensions of the illuminant are greater in the direction of the y axis than in the direction of the z axis, the sector angles must be smaller in both columns, which lie on the z axis, than the sector angles of the facets in both columns which lie on the y axis. The sector angles in the in-between columns are to be selected appropriately between both these extreme values.

In practice the following cosine-related equation has proven highly appropriate:

$$\sigma_{r,s}=\frac{\sigma_z-\sigma_y}{2}\cdot\cos\left(4\pi\frac{s}{C_r}\right)+\frac{\sigma_z+\sigma_y}{2}$$

Other periodic equations can be selected with the same period, such as:

$$\sigma_{r,s}=(\sigma_z-\sigma_y)\cdot\left(\cos^2\left(2\pi\frac{s}{C_r}\right)-\frac{1}{2}\right)+\frac{\sigma_z+\sigma_y}{2}$$

If the facets are cylindrical, the cylindrical axes can be varied relative to the entire reflector. The cylindrical axes can run in a peripheral direction, for instance, and thus follow the course of a row, or they may run in the direction of the columns.

Figure 2:
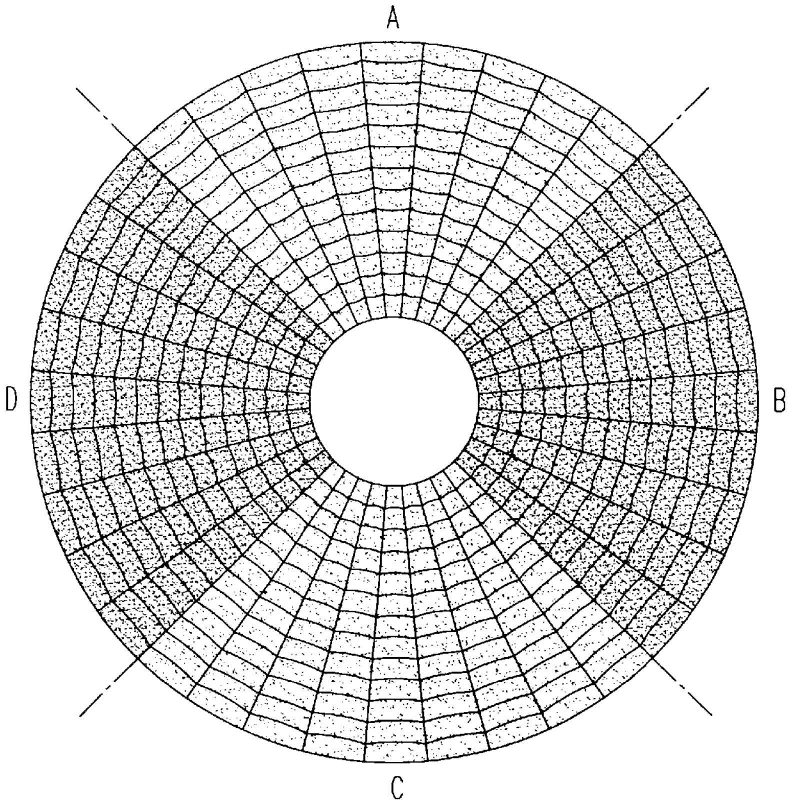
FIG. 2 is another plan view of a faceted reflector having four groups of facets.

In the embodiment according to FIG. 2 the entire reflector surface is subdivided into four equal sectors A, B, C and D of 90 degrees each. The z axis is at the same time the axis of symmetry of sectors A and C, while the y axis is simultaneously the axis of symmetry of sectors B and D. According to the desired light distribution and the desired light field an orientation of the cylindrical axis of the facets vertical (or tangential) to the reflector periphery is selected for sectors A and C, and an orientation tangential (or vertical) to the reflector periphery is selected for sectors B and D.

For the desired effect to be achieved a mark is to be applied appropriately to the reflector. By means thereof the lamp with the non-rotationally symmetrical illuminant can be installed in the correct angle position in the reflector. It can be recognized in which direction the oval light field extends.

Figure 3:
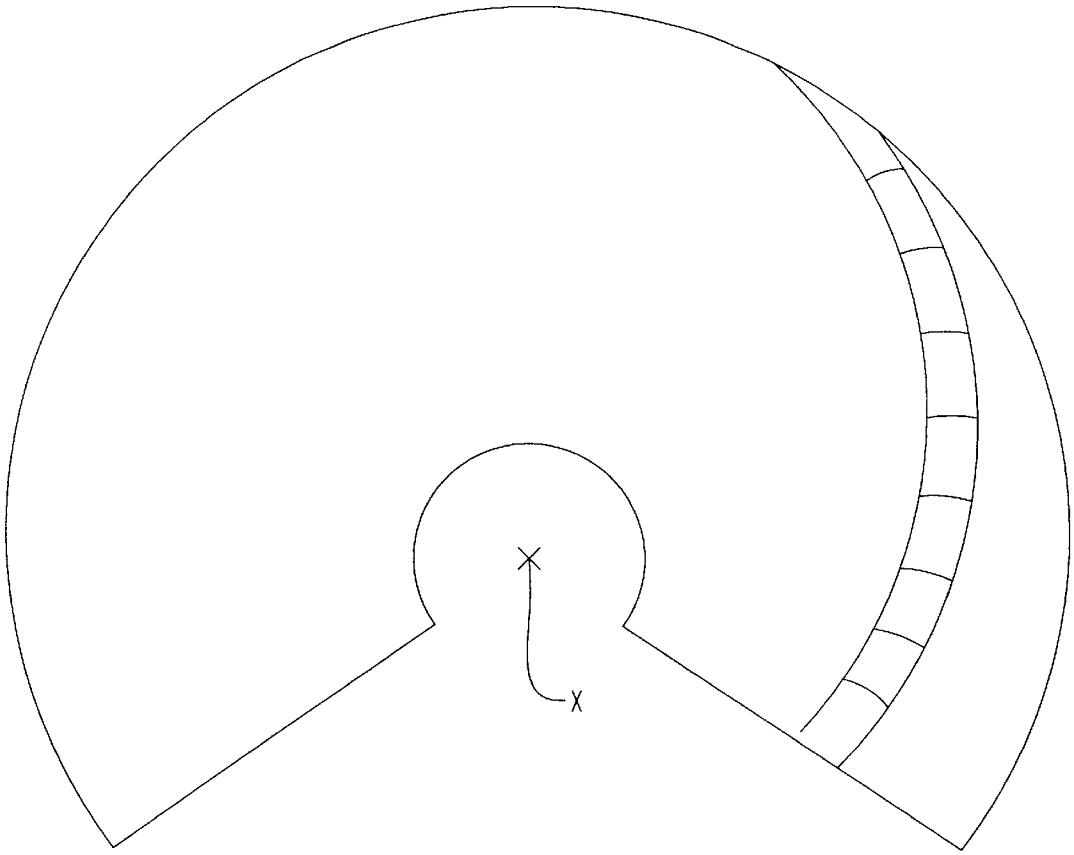
FIG. 3 is a plan view of a developed faceted reflector, in which only a single row is depicted.
Figure 4:
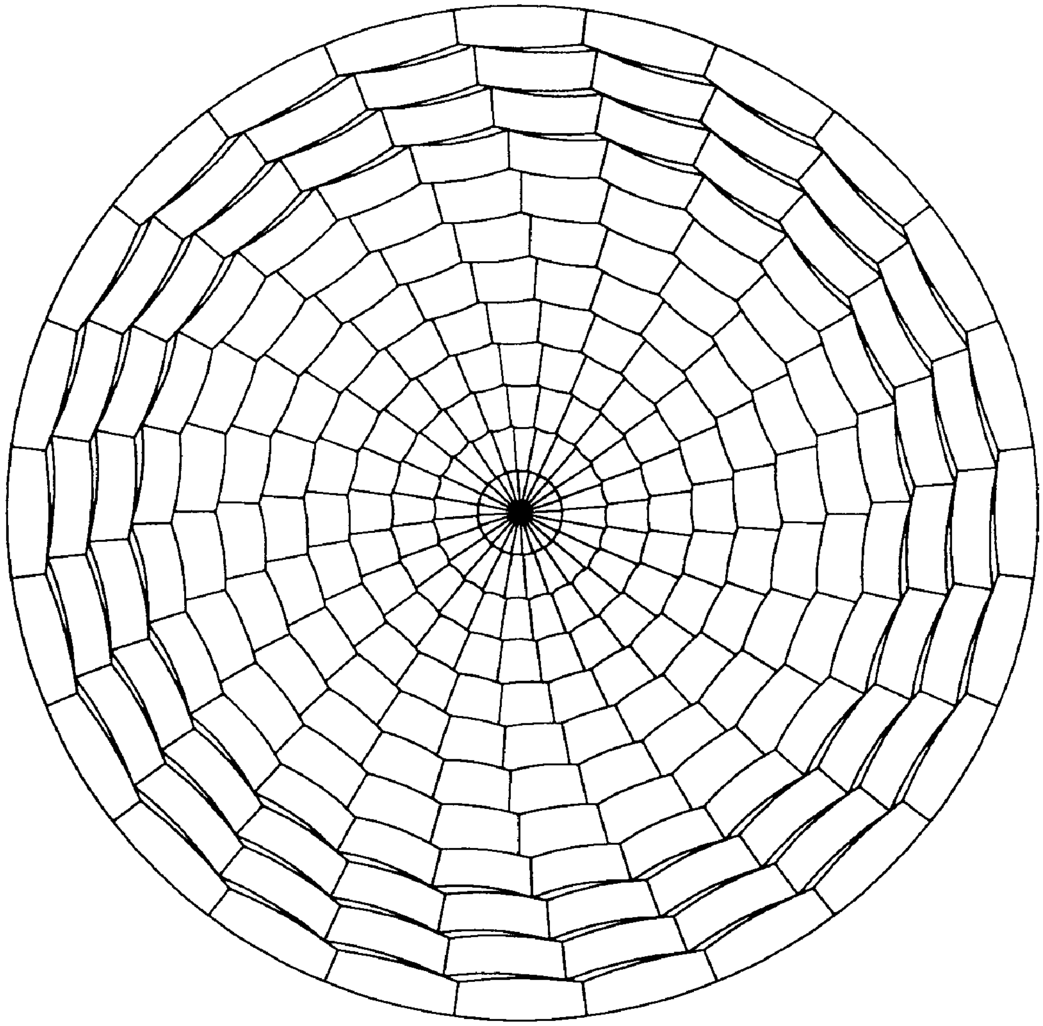
FIG. 4 is a plan view of a reflector having rows of facets offset with respect to one another.

FIG. 3 shows a single row of facets, which runs in a spiral around the x axis and thus around the optical axis of the reflector. The other rows also run in a spiral. The rows thus lie in planes which run vertically to the optical axis of the reflector.

In FIGS. 1 and 2 the dividing lines radially run between two adjacent columns. However, this does not have to be strictly so. Rather, the dividing lines, and thus the columns themselves, can take another course, for example a course inclined against the radials.

The expression 'facets' does not strictly mean surfaces sharply limited from one another. Rather, the facets can constantly transition into one another.

In the case of 'rows' and 'columns', there is not necessarily a strong division between individual rows and individual columns. Here, a constant transition between adjacent rows or adjacent columns is also possible. In this case this is only about ideal rows and ideal columns.

What is claimed is:

1. A reflector having a reflection surface with facets for reflecting light beams and for generating a light field with a hollow basic element that presents a mounting end, as well as a second end that represents a light outlet aperture, wherein, for generating a specific light field contour, individual ones of said facets have a selected form and a selected position relative to an optical axis of said reflection surface, wherein said facets are formed and arranged such that a rotational symmetry of said facets is substantially avoided.

2. The reflector of claim 1, wherein said facets are arranged in (a) rows grouped around said optical axis of said reflectance surface, and (b) columns extending from said light outlet aperture of said hollow basic element to said mounting end, and said facets of adjacent columns present different reflection performance.

3. A reflector having a reflection surface with facets for reflecting light beams and for generating a light field with a hollow basic element that presents a mounting end, as well as a second end that represents a light outlet aperture, whereby for generating a specific light field contour, individual ones of said facets have a selected form and a selected position relative to an optical axis of said reflection surface, wherein said facets are formed and arranged such that a rotational symmetry of said facets is substantially avoided, wherein said facets are arranged in (a) rows grouped around said optical axis of said reflectance surface, and (b) columns extending from said light outlet aperture of said hollow basic element to said mounting end, and said facets of adjacent columns present different reflection performance, and wherein said rows lie in planes that run vertically to said optical axis of said reflectance surface.

4. The reflector of claim 3, wherein there are dividing lines between said columns that lie in planes that run parallel to said optical axis.

5. The reflector of claim 4, wherein said rows of facets run in a spiral around said optical axis of said reflectance surface.

6. The reflector of claim 3, wherein said dividing lines between adjacent columns lie in planes that are inclined towards radials of said optical axis.

7. The reflector of claim 3, wherein at least a few of said facets are cylindrical surfaces.

8. The reflector of claim 3, wherein at least a few of said facets are spherical surfaces.

9. The reflector of claim 3, wherein at least a few of said facets present curved surfaces of the group that includes rotation ellipsoids or rotation paraboloids.

10. The reflector of claim 9, wherein said facets within a facet column have radii of different sizes.

11. The reflector of claim 10, wherein at least a few of said facets are flat surfaces.

* * * * *